United States Patent [19]

Böhnensieker

[11] Patent Number: 5,292,637
[45] Date of Patent: Mar. 8, 1994

[54] PROCESS AND APPARATUS FOR THE BIOLOGICAL CONVERSION OF ORGANIC MATERIAL IN BIOMASS

[76] Inventor: Franz Böhnensieker, Holtrup 60, D-4722 Ennigerloh-Westkirchen, Fed. Rep. of Germany

[21] Appl. No.: 944,948

[22] Filed: Sep. 15, 1992

Related U.S. Application Data

[63] Continuation-in-part of Ser. No. 905,892, Jun. 29, 1992, abandoned.

[30] Foreign Application Priority Data

Nov. 21, 1991 [EP] European Pat. Off. ........ 91119832.3

[51] Int. Cl.⁵ .......................... C12Q 3/00; C12M 1/38; C12M 1/06
[52] U.S. Cl. ........................................ 435/3; 435/290; 435/312; 435/315; 435/819; 71/9; 241/101.8; 241/199.12
[58] Field of Search .............. 241/101.8, 199.12; 71/9, 11, 14; 435/287, 290, 312, 313, 315, 3, 819; 422/184

[56] References Cited

U.S. PATENT DOCUMENTS

| | | | |
|---|---|---|---|
| 3,138,447 | 6/1964 | Eweson | 71/9 |
| 3,323,896 | 6/1967 | Brown | 71/9 |
| 3,837,810 | 9/1974 | Richards et al. | 21/9 |
| 3,845,939 | 11/1974 | Waldenville | 435/312 |
| 3,930,799 | 1/1976 | Eweson | 241/248 |
| 4,169,878 | 10/1979 | Etherington | 71/9 |
| 4,869,877 | 9/1989 | Sellew et al. | 422/184 |
| 4,956,002 | 9/1990 | Egarian | 422/184 |
| 5,047,349 | 9/1991 | Eweson, deceased | 435/312 |

FOREIGN PATENT DOCUMENTS

| | | |
|---|---|---|
| 0441994A1 | 8/1991 | European Pat. Off. . |
| 7936038 | 4/1980 | Fed. Rep. of Germany . |
| 3103869 | 9/1982 | Fed. Rep. of Germany ...... 435/287 |
| 8431486.9 | 12/1984 | Fed. Rep. of Germany . |
| 8519326.7 | 9/1985 | Fed. Rep. of Germany . |
| 8714138.8 | 1/1988 | Fed. Rep. of Germany . |
| 3819979A1 | 8/1989 | Fed. Rep. of Germany . |
| 3837865 | 10/1990 | Fed. Rep. of Germany . |
| 3844700C2 | 11/1990 | Fed. Rep. of Germany . |
| 4000916A1 | 2/1991 | Fed. Rep. of Germany . |
| 2318129 | 11/1977 | France . |
| 1022127 | 3/1966 | United Kingdom . |

Primary Examiner—Robert J. Warden
Assistant Examiner—T. A. Trembley
Attorney, Agent, or Firm—Griffin Butler Whisenhunt & Kurtossy

[57] ABSTRACT

A process and an apparatus for biological conversion (composting) of organic waste material, e.g. from kitchens or restaurants, involving use of a heat-insulated housing (1) having at least two separate chambers (7, 8). In the first chamber (7), organic material is introduced and treated in the presence of microorganisms until an intermediate stage of conversion into biomass only. A portion of the partially converted material, responsive to a certain temperature measured in the first chamber (7), is transferred for a final composting into the second chamber (8). Waste organic material is newly introduced into the first chamber (7) and treated therein together with a remaining portion of the partially converted material; thereby, because of the presence of a sufficient amount of active microorganisms in the first chamber (7), the process of conversion of the newly introduced waste material is started immediately. If desired, drying and/or sterilizing of the composted material can be performed in a third chamber. A transportation unit (40) can be temporarily coupled to the second or third chamber for receiving the composted material from the second or third chamber and for transporting it to a remote place for further use. A number of transportation units can be combined to form a transportation set.

22 Claims, 5 Drawing Sheets

PROCESS AND APPARATUS FOR THE BIOLOGICAL CONVERSION OF ORGANIC MATERIAL IN BIOMASS

This application is a Continuation-In Part Application of U.S. application Ser. No. 07/905,892, filed Jun. 29, 1992.

BACKGROUND OF THE INVENTION

This invention relates generally to a process and an apparatus for the biological conversion (composting) of organic materials in biomass wherein the organic materials are treated by finely comminuting and mixing them for a time in a substantially enclosed environment.

It is known to one skilled in the art that organic materials, in particular wastes from private households, restaurants etc., may be converted (composted) into reusable, valuable biomass (compost or decomposed material). It is known from German patent specification DE-C-38 37 865 to compost in a drum-shaped reaction container used together with a separate conditioning apparatus wherein material, prior to being put into the reaction container, is ground, or comminuted, to a suitable particle size, thereby allowing composting in the reaction container with a shortened starter phase (that is, the composting is accelerated more quickly). The advantage of having a fast acting conversion reaction must be weighed against relatively cost-intensive apparatus therefor, usually not suitable for stationary use in restaurant operations and the like. It is further known from prior art to compost in a one-step procedure with relatively compact apparatus (German patent specification DE-C-38 44 700) wherein the grinding and mixing of the material to be treated takes place in one and the same reactor until thorough composting is achieved. In this regard, it is also known (compare for example German patent DE-A-38 19 979) to accomplish one-step composting in a pivotal drum. The pivotal drum may, for example, be separated into two chambers (U.S. Pat. No. 38 37 810; German patent application DE-A-40 00 916) thereby allowing alternating operation so that smaller batches may be processed. One-step batch composting entails a comparatively long treatment period due to a necessarily long starter period for each batch even when, as already suggested (British patent document GB-C-1 022 127), the material to be treated is provided with a suitable quantity of microorganisms for speeding up the conversion process. Thus, a product is often thereby produced which is unsuitable for immediate use, for example in nurseries and the like, without further treatment. On the other hand, apparatus of the latter kind have the advantage, due to their compactness, that they are basically suitable for an economical, stationary use at a place of waste creation.

It is an object of this invention to provide a process and an apparatus as described above suitable to allow a conversion of wastes into a reusable biomass in a shortened treatment time period at a place of waste generation in a quasi-continuous process. This invention is geared in particular to an improvement of the biological conversion procedure of the invention of German patent De-C-38 44 700.

SUMMARY OF THE INVENTION

According to the invention, treatment of materials to be composted takes place in a first chamber only until the composting has reached a particular intermediate stage. A portion of the material composted to this intermediate stage is then moved into a second chamber where composting is continued to a final stage involving the dying of microorganisms. The portion of material composted only to the particular intermediate stage remaining in the first chamber ensures a high quantity of active microorganisms in this chamber available for attacking further materials introduced into the first chamber to immediately begin the process of conversion. Thus, this invention allows, without occasional adding of microorganisms, a continuously or quasi-continuously composting process wherein after a determined starter phase continuously new material is filled into the first chamber and partially composted material is moved from the first into the second chamber for final composting. The material is continuously, or in intervals, turned over and mixed in both chambers wherein this treatment may be combined with a process of grinding, or comminuting the material. Thereby, contact of waste material with surrounding air is assured thus continuously providing the microorganisms with sufficient oxygen for their work. The conversion, as an exothermic process, involves development of heat which may be used for warming air introduced into the chambers thereby making it quite unnecessary to provide primary energy for warming air. Also, the chambers, that is the housing, are heat-insulated against the outer environment, thereby allowing, in combination with the fact that the turning, mixing and grinding of the material takes place in an enclosed environment, the maintaining of process heat created during conversion until the end of the reaction, i.e. for the creation of optimal conditions of conversion in the individual chambers. If desired, excess process heat may be used for drying biomass from the second chamber in a third chamber. The process of this invention allows a particularly compact embodiment of the apparatus for its execution. A preferred embodiment of such an apparatus comprises the two chambers being pivotally arranged about a substantially horizontal axis known from the prior art. The mixing and turning of material in the chambers can, therefore, be performed in a particularly uncomplicated way by means of controlled alternate (unison) turning of the chambers. In addition, moving the material from the first into the second chamber can be done by uncomplicated means. According to a further aspect of this invention, an apparatus comprising a substantially closed housing with an intake and an outlet, a device for fine-comminuting, and a device for mixing the organic materials located in the housing, is characterized in that the housing has at least two substantially closed chambers separated from one another, a first of which has the intake and a second of which has the outlet, the housing is rotatable about a substantially horizontal pivot axis, a connecting passage between the first and second chambers is provided with a device for opening and closing it, the comminuting device comprises at least one grinding unit in at least the first chamber, and a disengageable transporter unit is included for transporting treated material away from the apparatus. The disengageable transporter unit has an intake opening and a device for allowing detachable coupling, or engagement thereof to the housing, wherein the intake opening of the disengageable transporter unit, in the engaged position, is aligned with the outlet of the housing in order to move treated material into the transporter unit during rotation of the housing. After it is filled, the transporter unit can be detached from the housing and replaced by an empty unit, thereby allowing particularly economical and hygienic handling of produced biomass. In this regard, a device may be provided on the transporter unit, according to a further embodiment of the invention, which allows the coupling of several filled transporter units together into an attached set which may be transported to a collection point, in a particularly efficient manner, for example by means of a truck. The compactness of the apparatus makes it suitable for immediate use at places of waste generation, for example at restaurants and the like, for the conversion of relatively large waste quantities into biomass without needing any further final conditioning.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
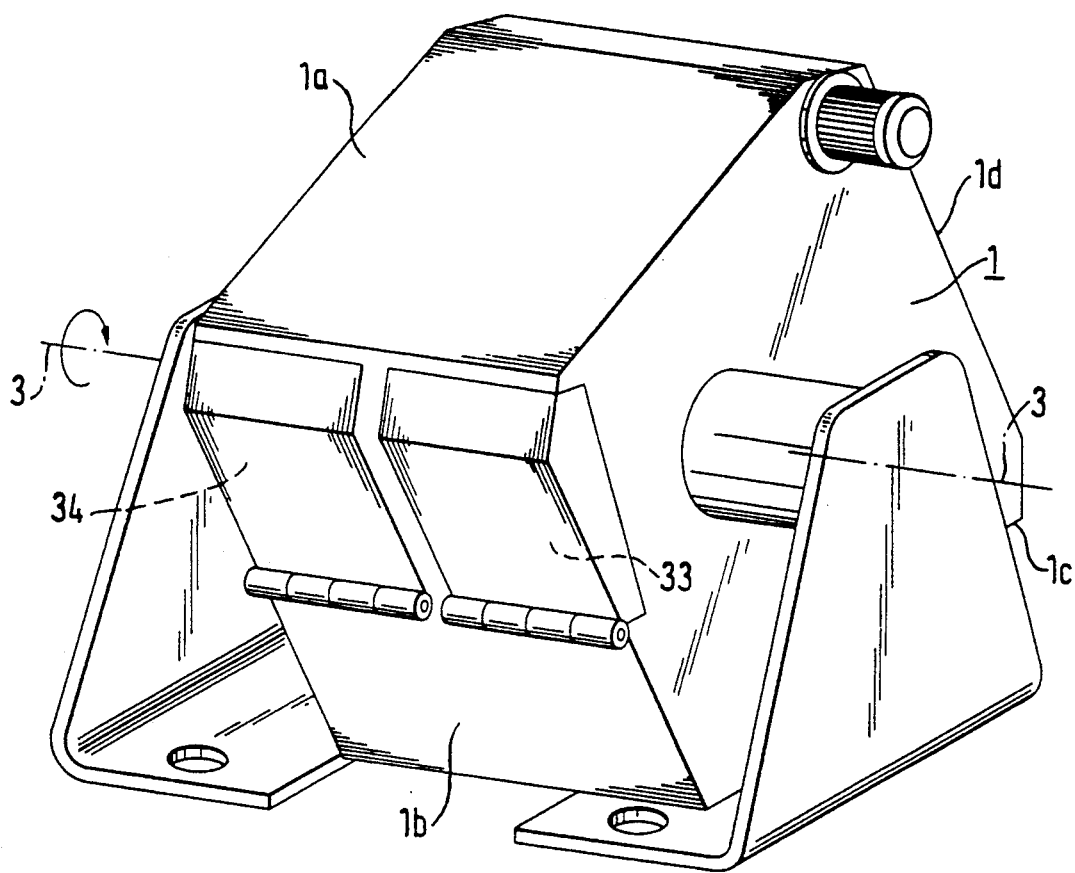
FIG. 1 is a perspective, partially-schematic, view of a biological conversion apparatus of the invention in a first embodiment.
Figure 2:
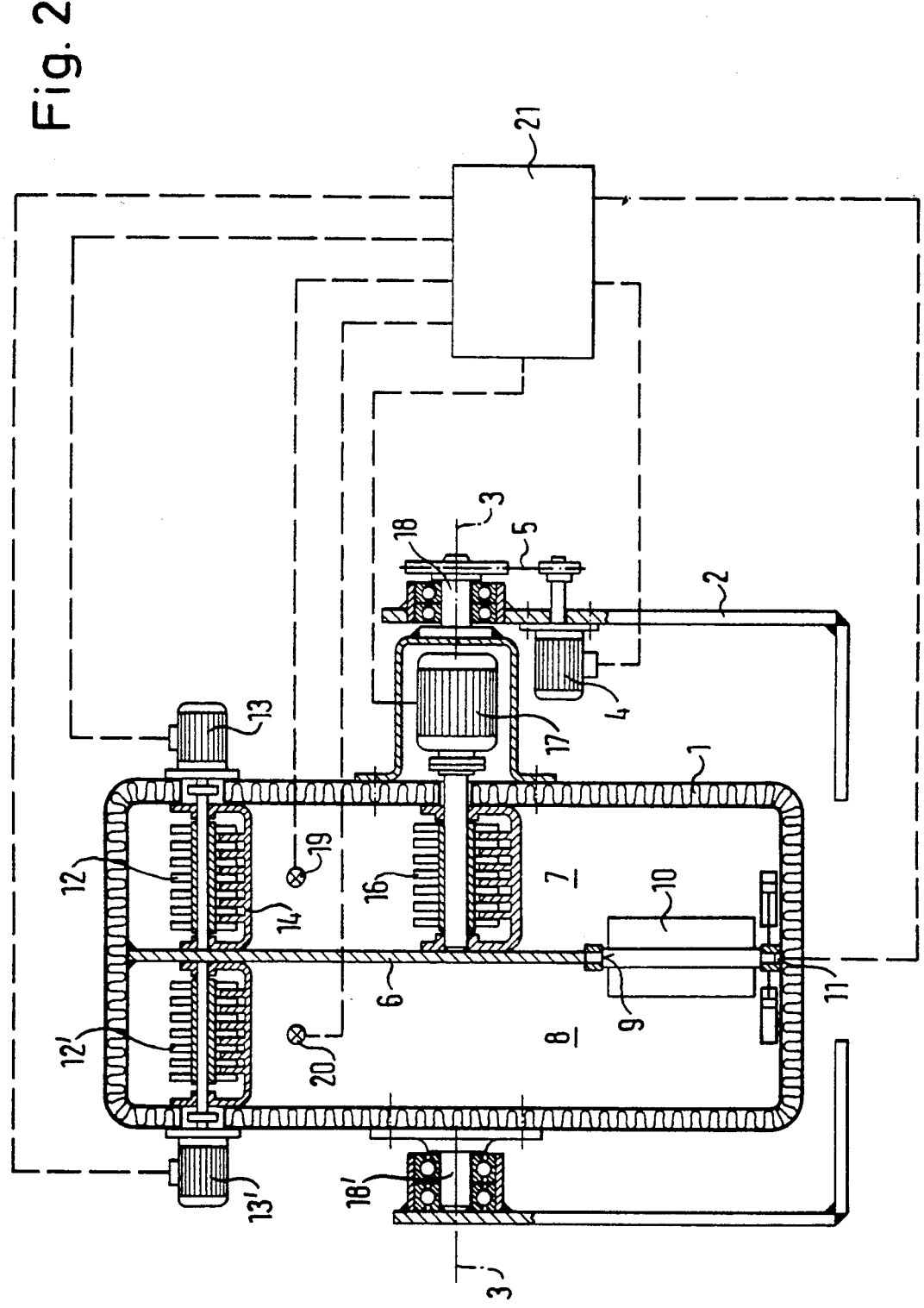
FIG. 2 shows the conversion apparatus as in FIG. 1 in a longitudinal, axial, cross-sectional view together with a schematic depiction of a control device for controlling the functions of the conversion apparatus.

In FIGS. 1 and 2, which depict a first embodiment of the invention, reference numeral 1 indicates a housing and numeral 2 indicates a pair of side frame-parts defining a horizontal axis 3 around which the housing is pivotally positioned by means of the frame parts 2.

At a suitable place about the periphery of the housing 1 a pair of openings 33, 34 is located with the openings being axially adjacent to one another and closed by the shown flaps.

The housing 1 preferably, as depicted, does not have a substantially round shape, comprising, for example four substantially smooth wall sections 1a-1d with adjoining pairs of these wall sections forming funnel-shaped sump areas in the interior of the housing 1 into which material to be converted can accumulate when the said adjoining walls point downwardly after rotating. However, the invention is not limited to the embodiment of the housing 1. Rather, it can also have a round or non-rectangular-polygonal-contour configuration.

As FIG. 2 shows further, the housing 1 is heat-insulated against outer environment by means of suitable insulation material. The interior of the housing 1 is divided into two, axially and adjoiningly positioned, housing areas or chambers 7 and 8 by a separating wall 6 extending in a radial plane relative to the axis 3. Alternatively, two independent housing units, heat-insulated against the outer environment, may be arranged adjacently on the axis 3. Further, the invention is not limited to a pair of housing spaces or housing units. Rather, further such units may be provided as is shown, for example, in FIG. 3.

A passage or opening 9 in the separating wall 6 connects the otherwise substantially enclosed housing areas 7, 8. The connecting passage 9 can be selectively opened or closed by means of a closure device 10. Even though other devices may be provided, the depicted closure device is arranged in the connecting passage 9 in the shape of a pivotal flap 10 which may be pivoted by means of a suitable activating part 11, for example a pneumatic piston-cylinder device, between a position in which the connecting passage 9 is closed and a position in which the connection between the housing areas 7 and 8 is open.

The connecting passage 9 is designed, as depicted, to be positioned at a radially outwardly located point of the separating wall 6, preferably near an apex of two adjoining flat perimeter wall sections 1a-1d of the housing 1 whereby material to be treated preferably accumulates in the area of the connecting passage 9 when the connecting passage 9 reaches a downwardly-facing position after rotation of the housing 1.

At a radially outwardly positioned place, for example diametrically across from the connecting passage 9, a comminuting device or grinder (as used herein, a "grinder" is a device for reducing to smaller pieces) 12, for finely-grinding, or comminuting, the material to be treated, is positioned in the interior of the first housing area 7. The grinder 12 may have any suitable structure. In this embodiment of this invention, the grinder 12 comprises a plurality of cutting elements arranged on a shaft in the interior of the housing area 7 arranged substantially parallel to the pivot axis 3 by means of a bracket 14. Such a grinder is described in German utility model De-U-87 14 138 herein referred to for further details. A shaft end reaching outwardly from the housing 1 is coupled to a motor 13 by means of which the shaft and thereby the cutting elements of the grinder may be set into rotary motion.

Although the diametrical arrangement of the grinder 12 in relationship to the connecting passage 9 is preferred, it is understood that the grinder 12 may also be in a non-diametrical position to the connecting passage 9 and that furthermore more than one such grinder 12, if desired, can be provided in the interior of the first housing area 7.

As shown also in FIG. 2, a further grinder, or comminuting device, 16 with a motor 17 can be centrically arranged on the pivotal axis 3 in the interior of the first housing area 7. The grinder 16 is preferably designed such that a rough comminuting of material introduced into the housing area 7 can be performed.

Also, a grinding, or comminuting, device can be arranged in the interior of the second housing area 8. Such a grinder 12' with a motor 13' can have a similar embodiment as that of the first grinder 12 of the first housing area 7. Although an actuator of the grinder 12' is preferably independent from that of the first housing area 7, a common actuator for both grinders 12 and 12' could be designed wherein cutting elements of both grinders 12 and 12' are arranged on one mutual shaft, extending through both housing areas 7 and 8.

The housing 1 comprises bearing pins, 18, 18' at its sidewalls held in bearings in the frame parts 2 for pivotal mounting it at the axis 3. On one of the bearing pins, 18, 18', an actuating device is mounted comprising an actuating motor 4 and a reduction gear 5, for example in the form of a chain and sprocket, in order to set the housing 1 into rotary motion.

Numeral 21 indicates an apparatus controlling one or several functions such as the rotary movement of the housing 1, the position of the closure element 10 of the connecting passage 9, operation of the grinders 12, 12' and 16, etc. Temperature measuring sensors 19 and 20 respectively for recording temperatures in housing areas 7 and 8 send corresponding signals to the control device 21 for controlling the mentioned functions dependent upon the measured temperatures. The control device 21 can further be designed such that rotating housing 1 or operating the grinders as well as the closure element 10 of the connecting passage 9 are controlled dependent upon time and the temperatures measured in the housing areas 7 and 8.

Finally, it should be noted that a device is provided, although not depicted, for intake of warmed fresh air into the interior of one or both housing areas 7, 8 and/or for the output of air therefrom. The warming of the fresh air is preferably achieved by using process heat created by conversion of material thereby making entirely or almost entirely unnecessary any induction of energy from outside. A fresh air intake or outlet as well as a warming device can be designed according to German patent specification DE-C-38 37 865 herein referring to that publication for details.

The conversion apparatus, arranged as described above, functions as follows:

Material to be treated, which can be biologically degradable wastes of all kinds, particularly wastes from kitchen and restaurant operations, is introduced into the first housing area 7 through the intake opening 33 in a precomminuted form. As soon as a suitable degree of filling, for example 60-70%, is reached, the intake opening 33 is closed and a signal is given to the actuating motor 4 for rotating the housing 1. During the rotation, the material in the first housing area 7 is continuously turned over. Further rough comminuting the material can, if desired, be linked to this process by means of the central grinder 16 to make the material a particle size suitable for further conditioning by the fine-grinder 12.

The inserted material is turned and mixed for a period of time with continual or stepped rotation of the housing 1. Since the radially-outwardly positioned fine-grinder 12 is moved repeatedly through the introduced material during the rotation of the housing 1, the material is further chewed-up to a particle size suitable for conversion. The rough grinder 16 can be disengaged after an appropriate period of time.

Conversion of the material in the first housing area 7 is coupled with a rise of temperature. Due to the insulation of the housing 1 the conversion can take place without substantial heat loss to the surroundings. For maintaining favorable conversion conditions for activity of microorganisms, warmed fresh air can be allowed into the interior of the housing area 7 continuously or from time to time.

Conversion of the material in the first housing area 7 is continued according to this invention only until it is noted that the temperature has stopped rising (end of conversion-starting phase). Immediately afterwards, or after a suitable period of time, for example several hours, the control device 21 gives a command to the actuating part 11 of the closure element 10 to position the closure element such that communication between the interiors of the first and second housing areas 7 and 8 is achieved. Herein, the closure element 10 can work as a guide baffle wherein it may guide material in the first housing area 7 through the connecting passage 9 into the second housing area 8 in the manner of a plow.

According to this invention, not the entire quantity of material in the first housing area 7 is moved into the second housing area 8, but only a suitable, partial quantity, approximately between 30% and 70% of the load of the first housing area 7. The proportion of material moved to that remaining may vary depending on the kind of material to be treated. Regarding biologically degradable wastes from kitchen and restaurant operations, it has been found that good results are achieved by moving approximately 50% of the material in the first housing area 7 which has been converted to an intermediate stage.

After moving the material into the second housing area 8, the connecting passage 9 is closed again and new, untreated material can be filled into the interior of the first housing area 7 through the intake opening 33 up to a desired filling level thereby having untreated as well as partially converted material in the housing area 7.

The composting process of the material in the housing areas 7 and 8 is continued with further mixing and rotating as well as grinding. In particular, in the second housing area 8 the final composting process of the introduced, partially-composted material into biomass is performed. A measurement for determining an end of the conversion process in the second housing area 8 is a decrease of temperature therein from a measured maximum. The decrease of temperature indicates that the activity of microorganisms is slowly ending. It has been found that the conversion can be considered to be substantially finished and that the material from the second housing area 8 may be removed through the output opening 7, when the temperature in the second housing area 8 has decreased by about 20% from a measured maximum. The measured maximum temperatures in the housing areas 7 and 8 depend upon the condition of and the kinds of materials to be treated and can be, for example, between 60° and 75° C.

Allowing conversion in the first housing area 7 only up to an intermediate stage provides for continuously sufficient quantities of active microorganisms in that housing area which ensure that the process of conversion of new input-material (starting phase) is begun immediately. Therefore, a characteristic feature of the invention is separation of the conversion process into a starter and a final phase which take place substantially separated from one another, that is without mutual influence.

Figure 3:
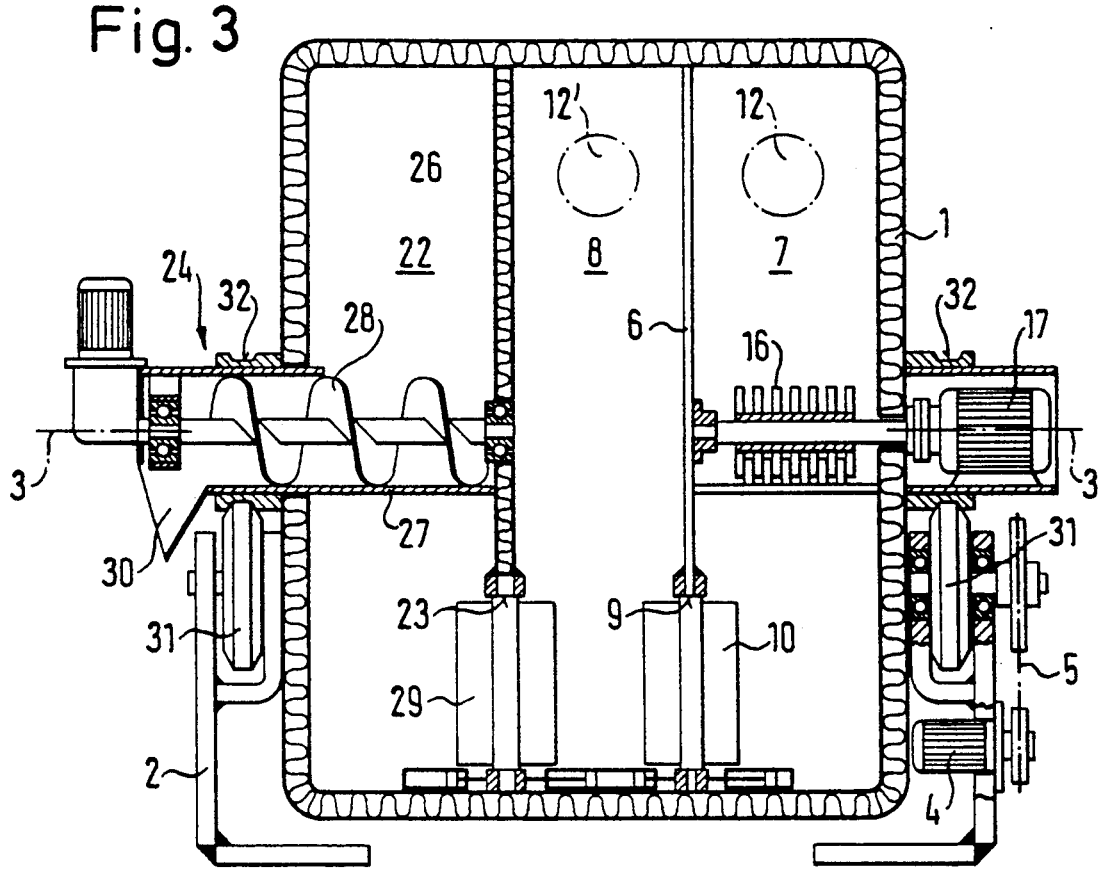
FIG. 3 depicts a modified conversion apparatus in a view similar to that of FIG. 2, without the control device for simplification.

In some cases, it may be necessary or desirable to subject the biomass to a follow-up drying process. This can be achieved according to the invention by adding to the first and second housing areas 7 and 8 a third housing area 22 as shown in FIG. 3. The third housing area 22 can be substantially structured like the first and second housing areas 7 and 8. However, it does not need to include a grinder. Devices (not shown) are provided for introducing heated air into the third housing area 22 and for releasing air therefrom together with the humidity absorbed by the air, thereby drying the material in the third housing area 22 as well as decreasing its temperature at the same time. Instead of, or in addition to, drying, a sterilization treatment of the material can also occur in the third chamber 22.

A connecting passage 23 and a separating wall 26 with a closing device 29, similar to that between the first and the second housing areas 7 and 8, allow a controlled transfer of the composted material from the second into the third housing area 22. Further, an output device 24 may be provided for transporting the composted, dried, material out of the third housing area 22. The output device 24 can, as shown, comprise a screw conveyor 28 arranged in a cylinder housing 27 mounted concentrically to the rotary axis 3, the conveyor being driven by a motor for moving the material out of the interior of the housing area 22 to an outlet 30 in a selective manner.

FIG. 3 shows a modified embodiment of apparatus for rotating the housing 1 about the pivot axis 3 by means of driven rolls 31 situated laterally of the housing on which roll rims 32 connected with the housing sidewalls are supported so that a rotation of the rolls 31 effects a corresponding rotation of the housing 1.

Numbers 12 and 12' indicate grinders extending into the interior of the housing areas 7 and 8 from a circumferential side of the housing 1, in a different manner than in the previously described embodiment. Further details for the embodiment of the invention as in FIG. 3 can be obtained by reference to the first embodiment described above.

Figure 4:
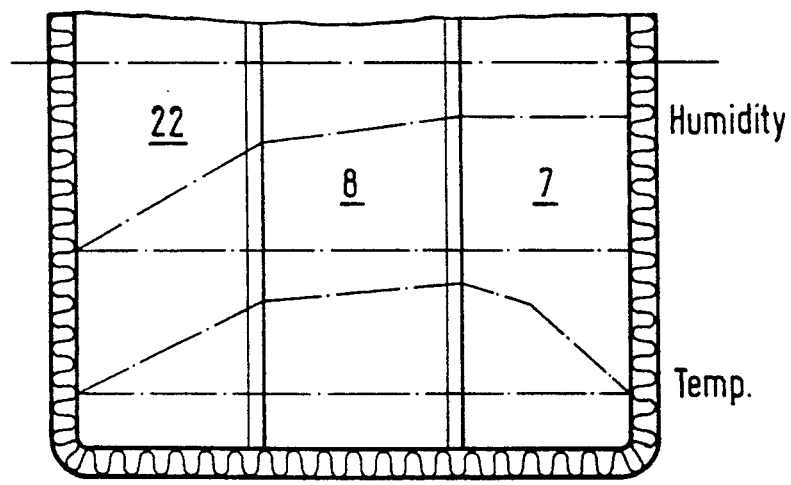
FIG. 4 is a cross-sectional view of the conversion apparatus as in FIG. 3 diagrammatically showing the curves of temperature and humidity.

FIG. 4 shows curves of temperature and humidity of material being treated in the individual housing areas 7, 8 and 22. As can be recognized, conversion takes place in the first and second housing areas 7 and 8, that is during the starter and final phases, substantially without heat loss to the environment and with substantially level or even humidity of material being treated.

Figure 5:
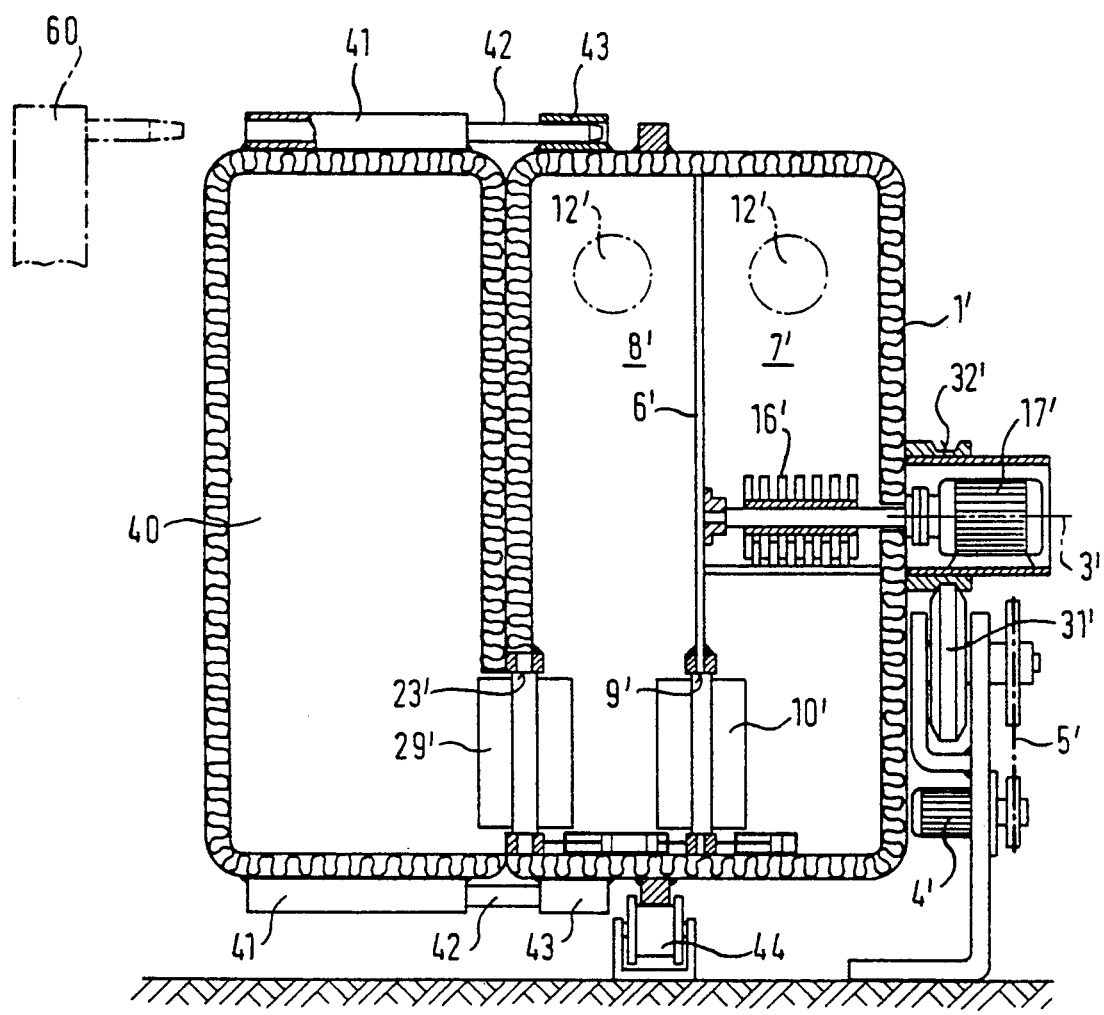
FIG. 5 is a cross-sectional, partial view of a conversion apparatus similar to that in FIG. 3 according to a further embodiment of the invention.

FIG. 5 shows a further embodiment of this invention. This embodiment is substantially distinguished from FIG. 3 in that the third chamber is omitted; instead a disengageable container unit 40 is provided which can be selectively coupled to, or engaged with, the conversion apparatus. For further details, FIG. 3 and its description are herein referred to. In FIG. 5 the same or similar components as those of the embodiment of FIG. 3 have the same reference numerals, though are provided with the prime ' designations.

The disengagegable container unit 40 comprises a basically closed container with a circumferential configuration adapted to, or corresponding to, that of the housing 1' of the conversion apparatus and has an intake opening at its front side. The intake opening is arranged according to the outlet passage 23' of the second chamber 8' and can be aligned such that upon activation of the closing device 29' the composted material located in the second chamber 8' may be moved into the disengageable container unit 40.

Although other functional devices may be provided for connecting the disengageable container unit 40 with the housing 1', the present embodiment provides therefor two or more socket-shaped elements 41 arranged in an appropriate manner circumferentially to the unit 40, in each of which is held one guide pin, or peg, 42 at one end while an opposite end thereof is open. The guide pins 42 protrude from the socket-shaped elements 41 substantially parallel to the pivot axis 3' of the apparatus and are capable of engaging receiving elements 43, which are designed for this purpose and are fixed to the housing 1'. Further, appropriate devices (not depicted) are provided for holding the guide pins 42 in engagement with the receiving elements 43 in a disengageable manner.

When the unit 40 is attached to the housing 1' and positioned such that the intake opening of the unit 40 is aligned with the outlet passage 23' of the second chamber 8', the housing 1' and the unit 40 coupled to it are rotated and the closing device 29' is activated at an appropriate time for opening the outlet passage 23' and for moving composted material, located in the second chamber 8', into the unit 40. When unit 40 is filled with composted material, operation of the conversion apparatus is temporarily interrupted for removal of the filled unit 40 from the housing 1' and replacement thereof with an empty one. Since the composted material has a substantially smaller volume than material to be treated and introduced into the first chamber 7', operation stops for exchanging unit 40 are required only after treatment of substantial amounts of introduced material.

For rotation of the housing 1', in addition to its being driven by the driven rotating devices 31', 32' of the embodiment according to FIG. 3, it is supported by an arrangement of rolls indicated at 44, which is provided circumferentially of housing 1', so that engagement and disengagement of unit 40 is not hindered by the arrangement of these rolls.

As further indicated in FIG. 5 by dot-dash lines, a handling device 60 may be provided with pins arranged such that they can engage free, or open, ends of the socket-shaped elements 41 of the engageable unit 40. The unit 40 can therefore be moved, after disengagement from the housing 1', by an operator using the handling device 60, to a collecting point from which several filled units 40 may be transported together, for example by means of a truck, for further use of the composted material. For transport, the pins 42 of a disengaged unit 40 can be engaged with the free, or open, ends of socket-shaped elements 41 of a neighboring unit 40 so that two or several units 40 may be connected into a particularly easy-to-handle attached set for transport.

Further, it should be noted that, if desired, the engageable unit 40 may also be used in connection with a treatment apparatus wherein composted material is first dried or sterilized in a third chamber according to an embodiment as in FIG. 3, before it is moved into the engageble unit 40.

Figure 6:
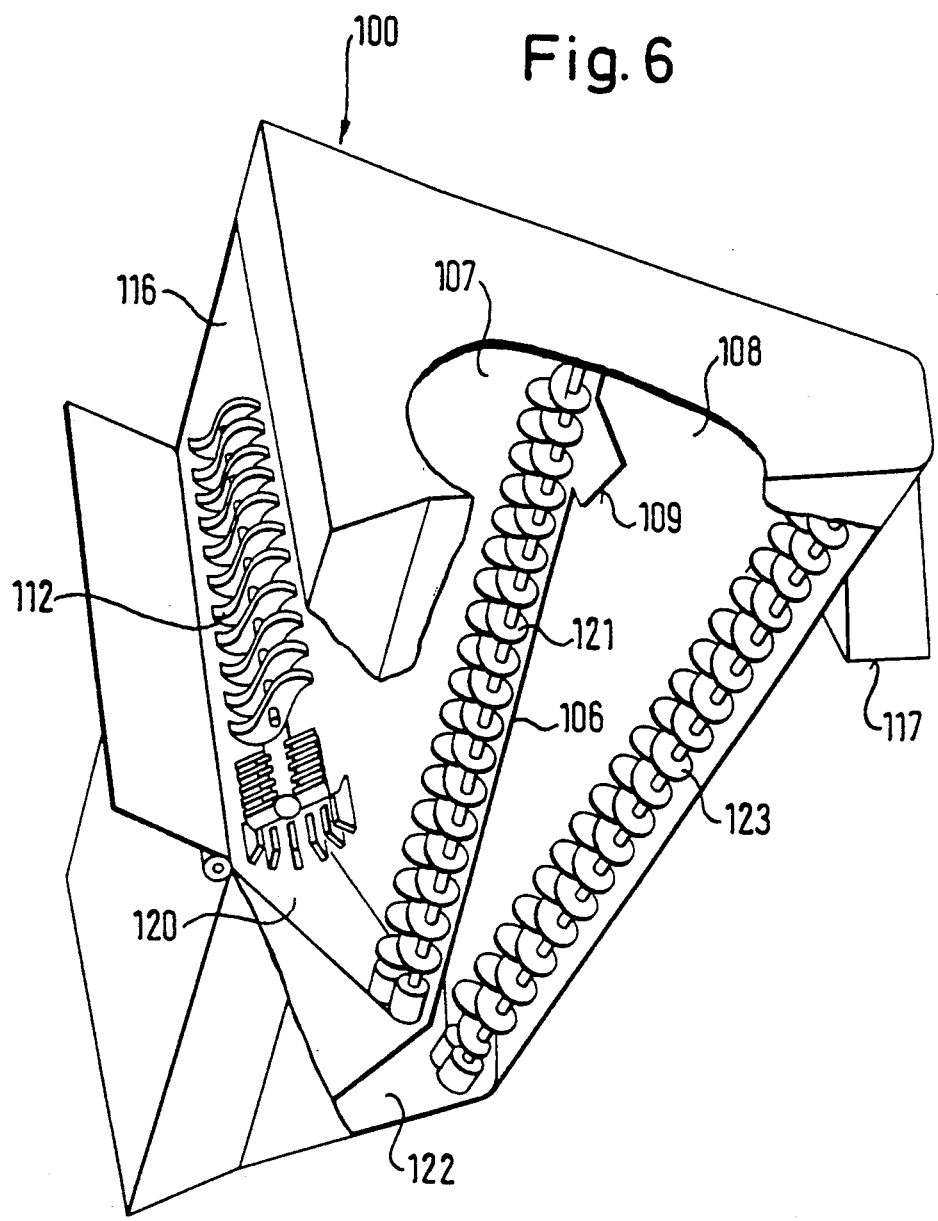
FIG. 6 is a perspective, partially-schematic, view of a biological conversion apparatus according to a third embodiment of the invention.

The further embodiment of the invention shown in FIG. 6 has a substantially vertical orientation in contrast to the previously described embodiment. It comprises a heat-insulated housing 100 with a closable intake opening 116 on its frontside providing access to a first housing area 107. A grinder 112 for fine-grinding input material is provided for the first housing area 107. The first housing area 107 is defined by a separating wall 106 separating the interior of the housing 100 into two separated, substantially vertically-elongated, areas 107 and 108.

In a lower portion of each housing area 107 and 108 sumps 120 and 122 are formed in which material to be treated can accumulate. In each housing area 107 and 108, a conveyor device is arranged in the shape of, for example, spiral conveyors 121 and 123 for moving material from the respective sumps 120 or 122 upwards thereby moving the material from a lower level, substantially defined by the sumps 120 or 122, to a higher level from where it may fall back to the lower level in free fall.

The higher level of the first housing area 107 is in particular located next to a delivery or connecting passage 109, interconnecting the first and second housing areas 107 and 108, and the higher level of the second housing area 108 is next to an output opening 117. The connecting passage 109 as well as the output opening 117 can be opened and closed, controlled by suitable, not shown, closure devices.

Also not shown are devices for supplying warmed fresh air into the housing areas 107 and 108, for controlling operation of the grinder 112 and the spiral conveyors 121, 123 as well as for opening and closing the connecting passage 109 and the output opening 117. These devices and other details can be constructed analogously using the described embodiments of FIG. 1 and 2 referred to herein.

Operation of the further embodiment of the invention of FIG. 6 corresponds to that of the embodiment described above. In particular, conversion of material to be treated is achieved in two steps, that is by allowing conversion in the first housing area only up to a determinate intermediate stage and finishing it only in the second housing area 108 while leaving a portion of partially converted material in the first housing area 107. Thereby it is assured that there will always be a sufficient quantity of active microorganisms in the first housing area 107 for starting conversion of newly introduced material with an accordingly shortening of the treatment period. In contrast to the above described embodiment, rotating and mixing of the material to be treated is here effected by moving the material between places of higher and lower levels with an interim movement phase defined by free fall.

It is understood that the invention is not limited to the described and shown embodiments, but includes such alternatives and modifications available to an ordinary person skilled in the art using the teachings herein.

I claim:

1. A process for biological conversion (composting) of organic material into biomass wherein the organic material is treated by mixing it for a time in at least two separate, substantially-closed chambers, said process comprising the steps of:
   introducing first organic material into a first substantially-closed chamber and treating it therein by mixing it and comminuting it until its conversion into biomass has progressed to an intermediate stage only;
   monitoring a temperature in the first substantially-closed chamber and in response to the temperature reaching a predetermined temperature level, thereby indicating that the conversion of said first organic material has progressed to said intermediate stage, transferring only a portion of the first organic material converted to the intermediate stage from the first to a second substantially-closed chamber for final composting into biomass;
   introducing second organic material into the first substantially-closed chamber to be treated with a remaining portion of the first organic material converted to the intermediate stage left in the first substantially-closed chamber, whereby treatment by mixing and comminuting of the second organic material is effected in the first substantially-closed chamber in the presence of said remaining portion of first organic material already converted to the intermediate stage.

2. A process as in claim 1 wherein is further included the step of monitoring a temperature in the second substantially-closed chamber and, in response to a predetermined temperature measurement, thereby indicating that the conversion of the first organic material in the second substantially-closed chamber has progressed to create the biomass, removing the biomass from the second substantially-closed chamber.

3. A process as in claim 2 wherein the step of removing the biomass from the second substantially-closed chamber is effected, at the earliest, when the temperature monitored in the second chamber has decreased from a maximum by a certain amount.

4. A process as in claim 1 wherein the step of transferring the first organic material from the first to the second substantially-closed chamber is effected a predetermined time after the temperature monitored in the first chamber has reached a maximum.

5. A process as in claim 1 wherein a percentage of between 30 and 70% of the first organic material converted to the intermediate stage in the first substantially-closed chamber is transferred from the first into the second substantially-closed chamber.

6. A process as in claim 5 wherein the percentage is approximately 50%.

7. A process as in claim 1 wherein the steps are carried out in the presence of heated air introduced into the at least two separate substantially-closed chambers.

8. A process as in claim 1 wherein the steps are carried out in the presence of, or by substantial use of, process heat developed during biological conversion.

9. A process as in claim 1 and further including the steps of transferring the composted biomass from the second substantially-closed chamber into a third chamber and drying and/or sterilizing the biomass in the third chamber.

10. An apparatus for biological conversion of organic material into biomass comprising:
   a substantially-closed housing having an inlet and an outlet and including at least two separate, substantially-closed chambers, said inlet being disposed to communicate with said first substantially-closed chamber and said outlet being disposed to communicate with said second substantially-closed chamber;
   a connecting passage allowing communication between the first and the second substantially-closed chambers and having means for opening and closing said connecting passage;
   mixing means for mixing the organic material in the first and second substantially-closed chambers;
   communicating means comprising at least one grinding device disposed in at least the first substantially-closed chamber for comminuting the organic material in at least the first substantially-closed chamber; and control means including temperature measuring means disposed in the first substantially-closed chamber for activating the means for opening and closing said connecting passage to thereby control the transfer of a portion of partially converted material in the first substantially-closed chamber from the first to the second substantially-closed chamber responsive to a predetermined temperature measurement in the first substantially-closed chamber.

11. An apparatus as in claim 10 and further comprising control means for controlling the comminuting means and the mixing means.

12. An apparatus as in claim 11 wherein said comminuting means includes a further grinding device in the second substantially-closed chamber.

13. An apparatus as in claim 11 wherein said control means is a single common control means which also controls said means for opening and closing the connecting passage.

14. An apparatus as in claim 10 wherein said substantially-closed housing is mounted for rotation about a substantially-horizontal rotary axis.

15. An apparatus as in claim 14 wherein said at least one grinding device is spaced a radial distance from the substantially-horizontal rotary axis in the first substantially-closed chamber.

16. An apparatus as in claim 14 wherein the connecting passage between the first and second substantially-closed chambers is radially spaced from the substantially-horizontal rotary axis.

17. An apparatus as in claim 10 wherein the connecting passage and the outlet are at a higher level than a sump, which is at a lower level of each substantially-closed chamber for accumulating the organic material, and wherein said apparatus includes a transport means for moving the organic material from the sump to the higher level of each substantially-closed chamber.

18. An apparatus as in claim 10 wherein said substantially-closed housing further includes a third, substantially-closed, chamber for receiving organic material from the second substantially-closed chamber for drying.

19. An apparatus as in claim 10 including means for heating fresh air using the process heat generated by composting of the organic material and for introducing the heated air into one or more of the substantially-closed chambers.

20. An apparatus as in claim 10 wherein each of the substantially-closed chambers is heat-insulated.

21. An apparatus for biological conversion of organic material into biomass comprising:

a substantially closed housing having an inlet and an outlet, a comminuting means for fine-comminuting and a means for mixing the organic material located in the housing, wherein the substantially-closed housing includes at least two, separate, substantially-closed chambers, said inlet being disposed to communicate with said first substantially-closed chamber and said outlet being disposed to communicate with said second substantially-closed chamber, wherein the means for mixing the organic material includes a means for rotating the substantially-closed housing about a substantially horizontal rotary axis, wherein said substantially-closed housing defines a connecting passage between the first and second substantially closed-chambers and wherein the substantially-closed housing further includes a means for opening and closing the passage, wherein the comminuting means includes at least one device for grinding organic material in at least the first substantially-closed chamber, and wherein the apparatus further includes a container unit for receiving the material treated by the apparatus, the container unit having an intake opening and including a means for disengageably coupling it to the substantially-closed housing, with the intake opening being aligned with the outlet of the substantially-closed housing when the container unit is coupled to the substantially-closed housing so that converted organic material is movable into the container unit during rotation of the substantially-closed housing and so that the container unit can be disengaged from the substantially-closed housing with converted organic material transferred therein for processing the enclosed converted organic material at a location removed from said substantially-closed housing.

22. An apparatus as in claim 21 wherein said container unit further includes a device for linking several similar container units into a coupled set for transportation thereof.

* * * * *